(12) United States Patent
LaFleur et al.

(10) Patent No.: US 9,016,515 B2
(45) Date of Patent: Apr. 28, 2015

(54) REMOVABLE GRIPPING DEVICE FOR A COOKING VESSEL WITHOUT INDEXING

(71) Applicant: Amefa France SA, Noiretable (FR)

(72) Inventors: Bernard LaFleur, Saint-Médard-en-Forez (FR); Luc Josancy, Sainte Colombe (FR)

(73) Assignee: Amefa France SA, Noiretable (FR)

( * ) Notice: Subject to any disclaimer, the term of this patent is extended or adjusted under 35 U.S.C. 154(b) by 0 days.

(21) Appl. No.: 14/355,955

(22) PCT Filed: Oct. 26, 2012

(86) PCT No.: PCT/EP2012/071273
§ 371 (c)(1),
(2) Date: May 2, 2014

(87) PCT Pub. No.: WO2013/064429
PCT Pub. Date: May 10, 2013

(65) Prior Publication Data
US 2014/0346180 A1   Nov. 27, 2014

(30) Foreign Application Priority Data
Nov. 4, 2011   (FR) .................................... 11 59995

(51) Int. Cl.
A47J 45/10   (2006.01)
A47J 45/07   (2006.01)

(52) U.S. Cl.
CPC  *A47J 45/10* (2013.01); *A47J 45/07* (2013.01); *A47J 45/071* (2013.01)

(58) Field of Classification Search
USPC ...................... 220/759, 769, 753, 752, 573.1; 294/31.1, 104; 16/425
See application file for complete search history.

(56) References Cited

U.S. PATENT DOCUMENTS

| 1,550,030 A | 8/1925 | John |
| 3,059,809 A | 10/1962 | Thompson, III |
| 3,272,547 A | 9/1966 | Pryce |

FOREIGN PATENT DOCUMENTS

| EP | 1523265 | 7/2003 |
| FR | 2381442 | 9/1978 |

*Primary Examiner* — Mickey Yu
*Assistant Examiner* — Allan Stevens
(74) *Attorney, Agent, or Firm* — Occhiuti & Rohlicek LLP

(57) ABSTRACT

A removable handle assembly for a cooking vessel a gripping body, a front end of which forms a flared jaw. The flared jaw has projections adapted to clamp the wall of a vessel. The projections are substantially linear in shape in directions that intersect in front of the gripping body. A flared mobile jaw is mounted on the gripping body to rotate about a first axis between a release position and a clamping position. The flared jaw has two projections (504) of substantially linear shape in directions that intersect in front of the gripping body. An actuating lever mounted on the gripping body rotates about a second axis between a deployed position and a retracted position. A mechanism actuated by the actuating lever locks the mobile jaw in the clamping position.

10 Claims, 6 Drawing Sheets

REMOVABLE GRIPPING DEVICE FOR A COOKING VESSEL WITHOUT INDEXING

RELATED APPLICATIONS

Under 35 USC 371, this application is the US national stage of PCT/EP2012/071273, filed on Oct. 26, 2012 which claims the benefit of the Nov. 4, 2011 priority date of French application 1159995, the contents of which are herein incorporated by reference.

FIELD OF INVENTION

The present invention concerns a removable gripping device for a cooking vessel, an in particular, a removable handle assembly for a saucepan.

BACKGROUND

Storing cooking vessels without their handles can significantly reduce the overall size of a set of saucepans and frying pans. As a result, an increasing number of cooking vessels include a removable handle assembly.

In order to favor the mechanical retention of the removable handle assembly on the cooking vessel, a certain number of vessels have been designed with a projecting stud, referred to as the "predisposition stud," fixed to the periphery. However, such a cooking vessel allows gripping in only one position and proves dependent on the condition of this stud.

Consequently, most cooking vessels with a removable handle assembly are now designed with removable handle assemblies for fixing onto cooking vessels with no predisposition studs. A removable handle assembly with no predisposition stud generally employs the principle of a clamp applying clamping forces over a large area of a lateral wall of the cooking vessel.

EP1523265 describes a removable handle assembly having a mobile jaw that can translate relative to a handle. The mobile jaw has a clamping position, in which it presses the lateral wall of the cooking vessel against the handle, and a release position, in which it is moved away from the handle. To make the user safe, the handle assembly includes a locking mechanism designed to prevent the mobile jaw from being moved away when it is in the clamping position.

In order to ensure satisfactory mechanical strength of the removable handle assembly if high forces are applied to the vessel, the mobile jaw and the handle have a relatively large surface in contact with the vessel. As these contact surfaces must clamp a substantially cylindrical wall of the saucepan, such a handle assembly proves inappropriate for satisfactory clamping of cooking vessels with greatly different diameters or induces an unacceptable deformation or surface damage of the vessel to prevent the presence of play in any of the configurations. These problems must be solved without making the locking of the removable handle assembly onto the vessel less safe.

U.S. Pat. No. 3,059,809 describes a removable handle assembly for a cooking vessel. The handle assembly includes a gripping body, a front end of which forms a flared jaw. The handle assembly further includes a rotatable flared mobile jaw mounted on the gripping body.

SUMMARY

The invention aims to remove one or more of the above drawbacks. Thus the invention relates to a removable handle assembly for a cooking vessel, including: a gripping body a front end of which forms a flared jaw, the flared jaw including two projections adapted to clamp the wall of a vessel, the two projections being of substantially linear shape in directions that intersect in front of the gripping body; a flared mobile jaw mounted on the gripping body to rotate about a first axis between a release position and a clamping position, the flared jaw including two projections of substantially linear shape the directions of which intersect in front of the gripping body; an actuating lever mounted on the gripping body to rotate about a second axis between a deployed position and a retracted position; and a mechanism actuated by the actuating lever for locking the mobile jaw in the clamping position.

In one embodiment, the flared jaw of the gripping body is substantially Y-shaped and the front end of the flared mobile jaw is substantially Y-shaped.

In another embodiment, the gripping body includes a handle extending to its rear end, the handle extending in a direction forming an angle between 5° and 30° relative to a plane including the directions of the projections of the flared jaw of the gripping body.

In another embodiment, the intersection between the directions of the projections of the gripping body is located between 80 and 150 mm in front of these projections.

In a further embodiment, the flared mobile jaw includes at least one face intended to bear on a cooking vessel in the clamping position, the bearing face forming an angle between 65 and 90° relative to the direction of one of said projections of the mobile jaw.

In some embodiments, the flared mobile jaw includes a recessed portion to the rear of its linear projections.

In other embodiments, the projections of the gripping body and the projections of the mobile jaw are superposed when the mobile jaw is in the clamping position.

In yet other embodiments, there is a distance between 0.7 mm and 3 mm between the projections of the gripping body and the projections of the mobile jaw when the mobile jaw is in the clamping position.

Among the embodiments are those in which the locking mechanism includes: a swing-arm mounted to pivot about an axis parallel to the pivot axis of the lever and urged toward a locking position by a return force; a locking member mounted to slide in a radial direction of the swing-arm and constrained to pivot with the swing-arm, the locking member being accommodated in a space between a wall fastened to the gripping body and a wall fastened to the mobile jaw, the space being reduced in size along the pivoting travel of the locking member induced by the return force until the clearance between the locking member and said walls is zero.

In another aspect, the invention features a cooking utensil that has any of the foregoing removable handle assemblies in combination with a cooking vessel in that has a lateral wall and a peripheral lip extending from the lateral wall and configured to be clamped between the flared jaw of the gripping body and the flared mobile jaw in the clamping position.

In another aspect, the invention features an apparatus comprising a removable handle assembly for a cooking vessel The removable handle assembly includes a gripping body, a flared mobile jaw, an actuating lever, and a locking mechanism. The gripping body includes a front end that forms a flared fixed jaw. The flared fixed jaw has a first projection and a second projection. The two projections adapted to clamp to a wall of a cooking vessel. The first projection is linear along a first direction, and the second projection is also linear, but along a second direction. The first direction and the second direction intersect in front of the gripping body. The flared mobile jaw is mounted on the gripping body to transition, through rotation about a first axis, between a release position and a clamping position.

The flared mobile jaw has a first projection and a second projection. The first projection is linear and extends along a third direction. The second projection is also linear, but extends along a fourth direction. The third projection intersects the fourth direction in front of the gripping body.

The actuating lever is mounted on the gripping body, and is configured to transition, through rotation about a second axis, between a deployed position and a retracted position. The actuating lever actuates the locking mechanism for locking the mobile jaw in the clamping position.

In some embodiments, the flared jaw of the gripping body is Y-shaped, and the front end of the flared mobile jaw is Y-shaped.

In other embodiments, the gripping body comprises a handle that extends to a rear end of the gripping body. The handle extends in a direction that forms an angle of between 5° and 30° relative to a plane that includes the directions of the projections of the flared jaw of the gripping body.

In yet other embodiments, the intersection between the directions of the projections of the gripping body is located between 80 mm and 150 mm in front of the projections.

Also included within the scope of the invention are embodiments in which the flared mobile jaw comprises a face configured to bear on a cooking vessel in the clamping position, and in which the bearing face forms an angle between 65° and 90° relative to a direction of one of the projections of the mobile jaw.

In some alternate embodiments, the flared mobile jaw comprises a recessed portion to a rear of the linear projections thereof.

In other embodiments, the projections of the gripping body and the projections of the mobile jaw are superposed when the mobile jaw is in the clamping position. Among these are embodiments in which there exists a distance of between 0.7 mm and 3 mm between the projections of the gripping body and the projections of the mobile jaw when the mobile jaw is in the clamping position.

In other embodiments, the locking mechanism comprises a swing-arm and a locking member. The swing-arm is mounted to pivot about an axis parallel to the pivot axis of the lever and is urged toward a locking position by a return force.

The locking member is mounted to slide in a radial direction of the swing-arm, and is constrained to pivot with the swing-arm. The locking member is accommodated in a space between a wall fastened to the gripping body and a wall fastened to the mobile jaw. This space reduces in size along the pivoting travel of the locking member induced by the return force until a clearance between the locking member and the walls is zero.

Yet other embodiments include a cooking vessel, wherein the cooking vessel that has a lateral wall and a peripheral lip. The peripheral lip extends from the lateral wall and is configured to be clamped between the flared jaw of the gripping body and the flared mobile jaw in the clamping position. Accordingly, the cooking vessel and the removable handle assembly cooperate to form a cooking utensil.

BRIEF DESCRIPTION OF THE DRAWINGS

Other features and advantages of the invention will emerge clearly from the following description thereof given by way of illustrative and non-limiting example with reference to the appended drawings, in which:

FIG. 1 shows a cooking utensil 1 in accordance with one embodiment of the invention. The cooking utensil 1 includes a cooking vessel 2, in this instance a saucepan. The cooking utensil 1 further includes a gripping device or removable handle assembly 3. The removable handle assembly 3 is fixed to the vessel 2, the vessel 2 being a vessel with no predisposition stud. The removable handle assembly 3 is configured to be fixed to a range of cooking utensils having different diameters. The removable handle assembly 3 is, in practice, fixed by clamping the lateral wall of the vessel 2, in particular on a peripheral lip 21 of the lateral wall.

FIG. 2 is an inclined view of the removable handle assembly 3. The removable handle assembly 3 includes a gripping body 4, a mobile jaw 5, an actuating lever 7, and a mechanism 6 for locking and unlocking the mobile jaw.

Figure 1:
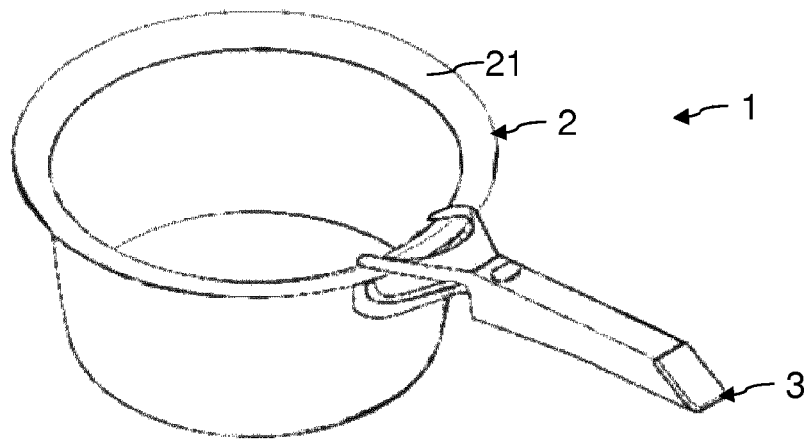
FIG. 1 is a perspective view of one example of a cooking utensil in accordance with the invention.
Figure 2:
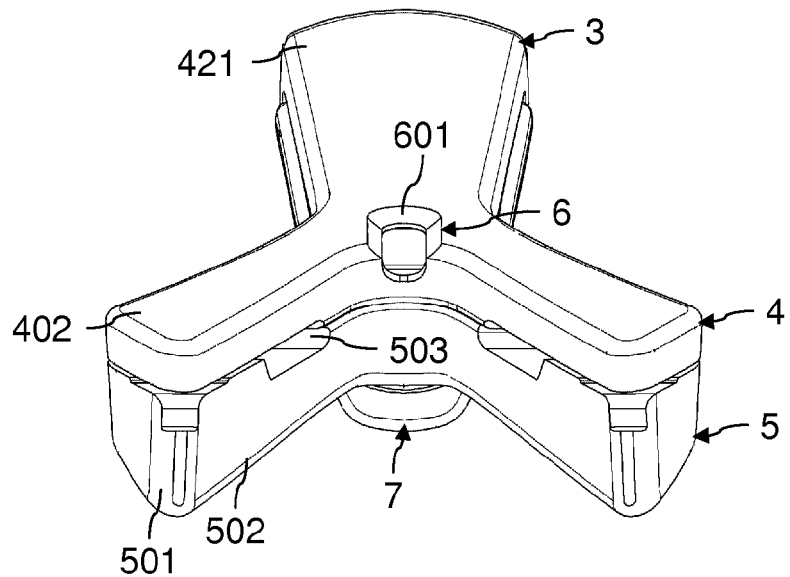
FIG. 2 is an inclined view of one embodiment of a removable handle assembly for such a cooking utensil.

The gripping body 4 includes a handle 421 extending in a longitudinal direction over the rear portion of the gripping body 4. The gripping body 4 also includes a front end 402 forming a flared fixed jaw. The front end 402 is flared laterally relative to the handle 421.

The mobile jaw 5 is mounted so as to pivot relative to the gripping body 4 about a transverse shaft 512. The mobile jaw 5 is mounted to pivot between a release position and a position clamping the lip 21. In the clamping position, the mobile jaw 5 and the fixed jaw are configured to clamp the lip 21 of the cooking vessel 2. The mobile jaw 5 has a flared front end. The flared end of the mobile jaw 5 is superposed on the front end 402 of the gripping body 4 in the clamping position.

Figure 5:
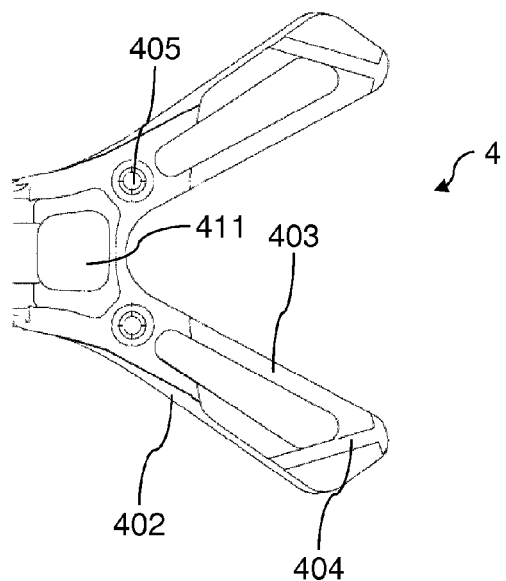
FIGS. 5 and 6 are bottom views of a fixed jaw of the removable handle assembly from FIG. 2.
Figure 6:
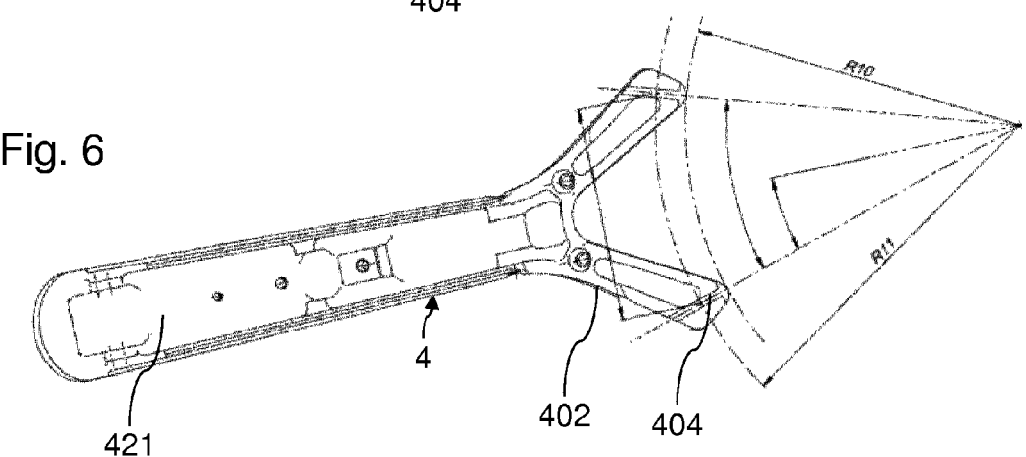
Figure 7:
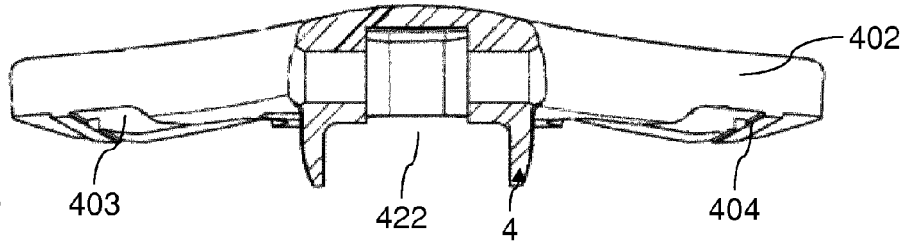
FIG. 7 is a rear sectional view of the fixed jaw from FIGS. 5 and 6.

FIGS. 5 to 7 show the structure of the gripping body 4 in more detail. FIG. 5 is a bottom view of the fixed jaw formed at the front end of the gripping body 4. The fixed jaw includes two projections 404, advantageously disposed on respective opposite sides of the longitudinal axis of the handle 421. The projections 404 are at the front end of the gripping body 4. The projections 404 project vertically to form clamping contact surfaces with the peripheral lip 21 of the vessel 2. The projections 404 have a substantially linear shape in order to ensure stability and less deformation on contact with the peripheral lip 21. The directions of the projections 404 intersect in front of the gripping body 4, as shown in FIG. 6.

Figure 8:
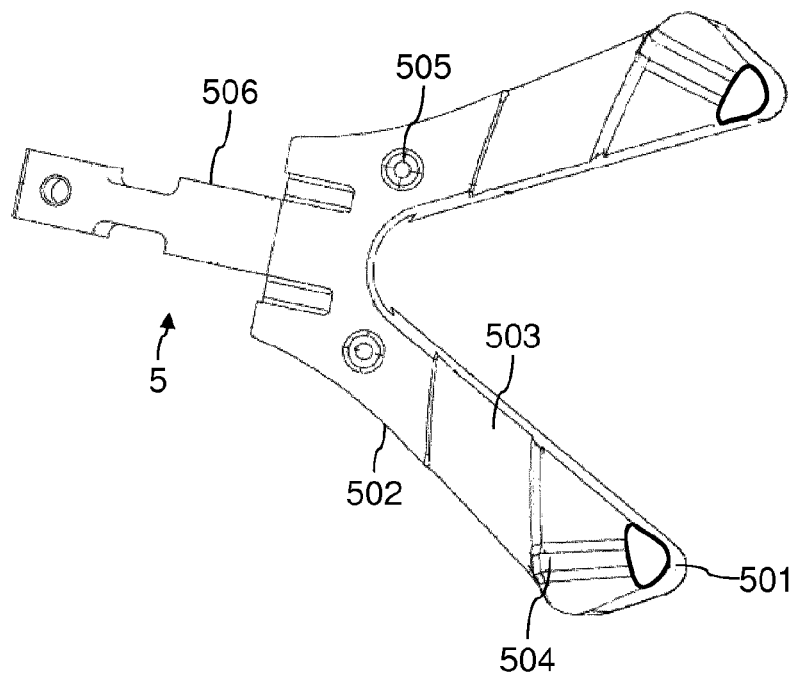
FIG. 8 is a top view of a mobile jaw of the removable handle assembly from FIG. 7
Figure 9:
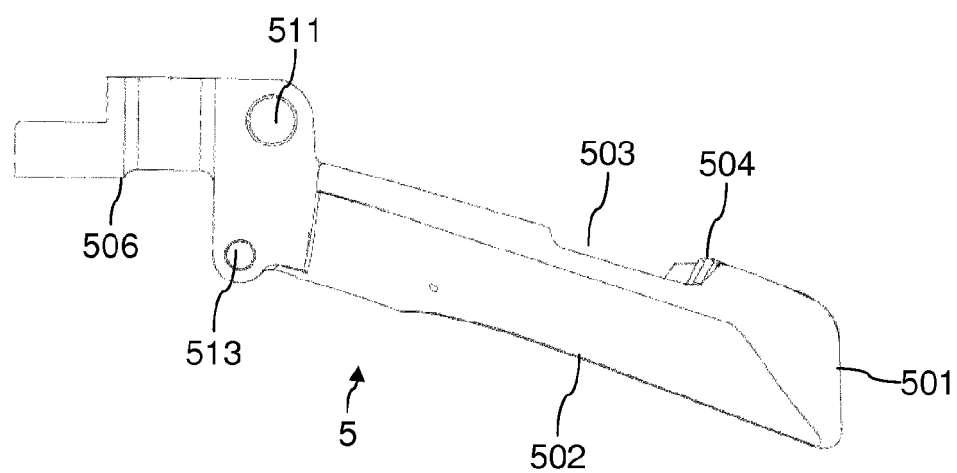
FIG. 9 is a side view of the mobile jaw of the removable handle assembly from FIG. 2.

FIGS. 8 and 9 show the structure of the mobile jaw 5 in more detail. The mobile jaw 5 includes two projections 504, advantageously disposed on respective opposite sides of the longitudinal axis of the handle 421. The projections 504 are on the upper face of the mobile jaw 5, at its front end. The projections 504 form clamping contact surfaces with the peripheral lip 21 of the vessel 2. The projections 504 have a substantially linear shape in order to ensure stability and less deformation on contact with the peripheral lip 21. In the clamping position, the directions of the projections 504 intersect in front of the gripping body 4. The projections 504 are advantageously superposed with the projections 404 in the clamping position.

The actuating lever 7 is disposed in the lower portion of the removable handle assembly 3. The actuating lever 7 is mounted to pivot about an axis transverse to the gripping body 4 between a deployed position and a retracted position. The actuating lever 7 is intended to load a locking mechanism 6 to lock the mobile jaw 5 in the clamping position. The actuating lever 7 being mounted to pivot about an axis parallel to the pivot axis of the mobile jaw 5, the pivoting of the actuating lever 7 toward its retracted position accompanies the pivoting of the mobile jaw 5 toward its clamping position.

Figure 3:
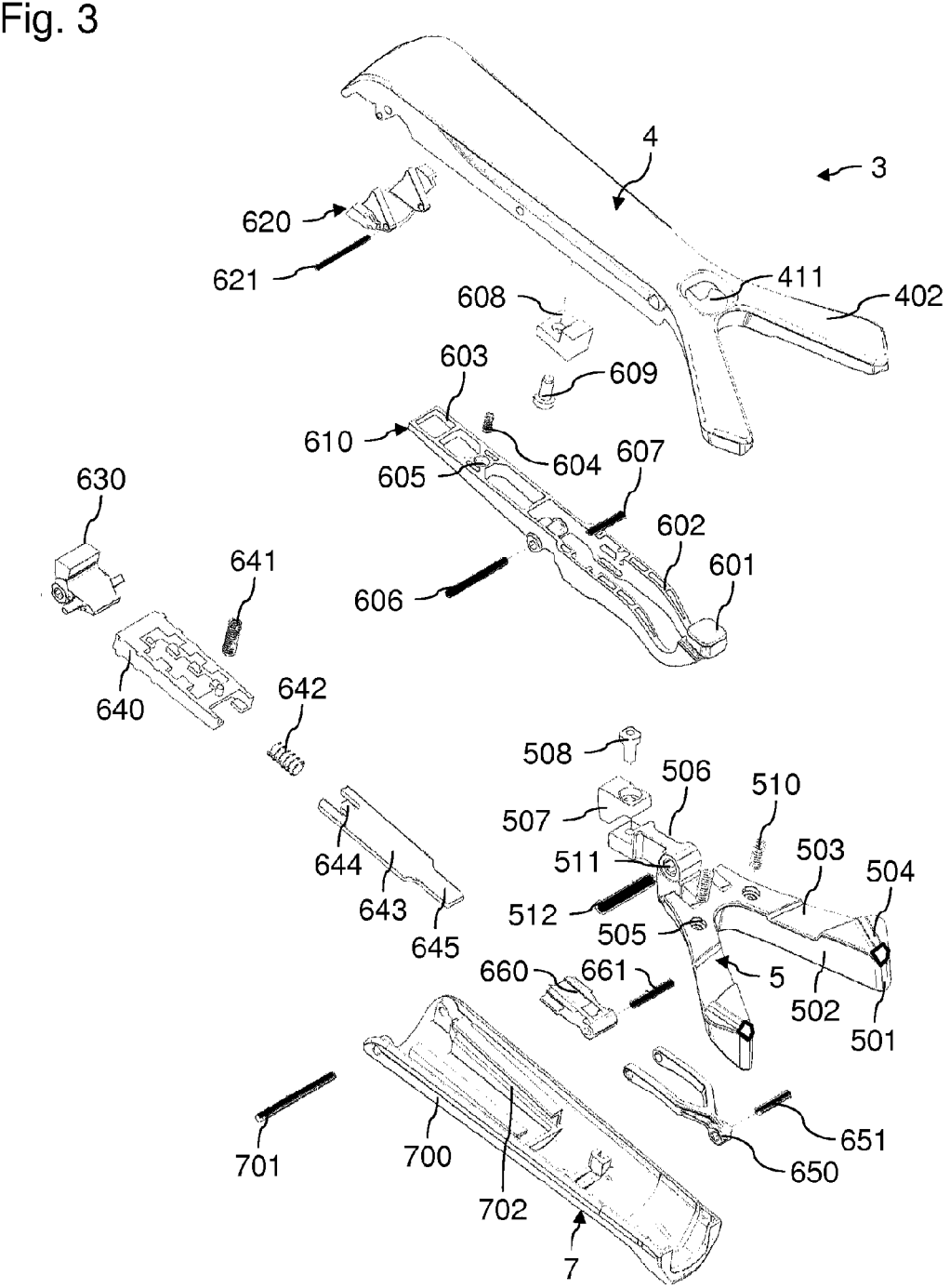
FIG. 3 is an exploded perspective view of the removable handle assembly from FIG. 2.
Figure 4:
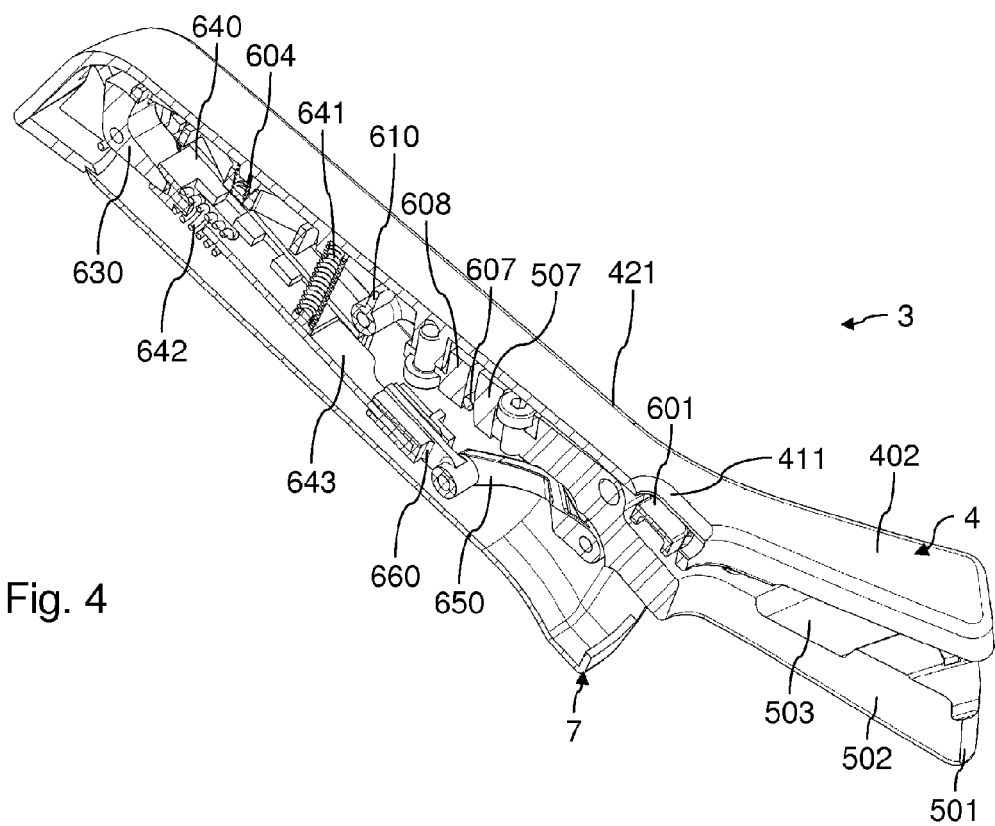
FIG. 4 is a sectional perspective view of the removable handle assembly from FIG. 2.

FIG. 3 is an exploded perspective view of the removable handle assembly 3. The actuating lever 7 includes a shell 700 pivotally mounted at the rear end of the handle 421 on a shaft 701. The shell 700 and the handle 421 delimit an interior volume for housing various components of the handle assembly 3 and delimit a gripping surface allowing the user to apply holding forces to this handle assembly 3. The handle 421 includes a recess 422. The shell 700 allows the user to exert a manual locking torque on the actuating lever 7 so as to cause the actuating lever 7 to pivot toward its retracted position.

The gripping body 4 has an opening 411 passing through it. The fixed jaw at the front end 402 advantageously has a recessed portion 403 to the rear of each projection 404. The recessed portion 403 makes it possible to locate the bearing surface of the fixed jaw on the vessel 2 only at the level of the projections 404.

The locking mechanism 6 includes a bracket 620, a locking stud 608, a swing-arm 610, a locking shaft 607, a bracket 650, an end fitting 660, a leaf spring or lamella 643, a spring 642, an end fitting 640, and a locking pawl 630.

The bracket 620 is fixed to the rear end of the handle 421. The locking stud 608 is fixed to the handle 421 by means of a screw 609.

The swing-arm 610 is mounted to pivot about an axis transverse to the gripping body 4. Thus the swing-arm 610 includes a bore in which a shaft 606 is accommodated for its pivotable mounting relative to the gripping body 4. The shaft 606 is disposed substantially half way along the swing-arm 610 in this example. The swing-arm 610 has a front portion 602 in front of its pivot axis. An unlocking button 601 extends vertically at the front end of the front portion 602. A shaft 607 extending in a transverse direction is accommodated in the front portion 602 so as to be able to slide radially in the direction passing through the shaft 606 and the button 601. In contrast, the shaft 607 is constrained to move with pivoting movements of the swing-arm 610. The swing-arm 610 has a rear portion 603 to the rear of its pivot axis. The rear portion 603 includes a blind hole 605. The blind hole 605 accommodates one end of a return spring 604. The other end of the return spring 604 bears against the handle 421.

The opening 411 in the gripping body 4 allows access to the unlocking button 601. The unlocking button 601 is typically mounted so that it can slide in this opening 411. The pivot position of the swing-arm 610 defines the locked/unlocked state of the removable handle assembly 3. The return spring 604 urges the swing-arm 610 toward its locking position, as described hereinafter.

At the junction between the front end 502 and the rear end 506, the mobile jaw 5 includes a bore 511 through which the shaft 512 passes. The bore 511 is at the junction between the front portion 502 and the rear portion 506. The shaft 512 therefore enables the mobile jaw 5 to be mounted so that it can pivot relative to the gripping body 4.

A locking stud 507 is fixed to the rear portion 506 by a screw 508.

The front portion 502 of the mobile jaw 5 advantageously includes a recessed portion 503 to the rear of each projection 504. Contact faces 501 are formed in front of the projections 504 and are intended to serve as bearing faces for the lateral wall of the vessel 2 to be held. The front portion 502 advantageously includes a discontinuity between a contact face and a projection 504. The mobile jaw 5 can therefore absorb manufacturing-induced variations in the radius of curvature between the lip 21 and the lateral wall of the vessel 2.

Return springs 510 have a first end accommodated in blind holes 505 in the front portion 502 of the mobile jaw 5. The return springs 510 have a second end accommodated in blind holes 405 in the fixed jaw of the gripping body 4. The springs 510 urge the mobile jaw 5 toward its release position so that the vessel 2 can be released if the user presses on the unlocking button 601.

A first end of the bracket 650 is mounted to pivot about an axis transverse to the mobile jaw 5. To this end, a shaft 651 passes through the first end of the bracket 650. The shaft 651 is pivotally mounted in a bore 513 of the mobile jaw 5. The bore 513 is substantially vertically aligned with the bore 511 at the junction between the front portion 502 and the rear portion 506. The bracket 650 is advantageously disposed so that it exerts a force substantially perpendicular to an axis passing through the axes of the bores 511 and 513. A second end of the bracket 650 is mounted to pivot about an axis transverse to an end fitting 660 by means of a shaft 661. The shaft 661 connecting the end fitting 660 and the bracket 650 is mounted to be mobile in translation on the lever 7 in order to facilitate passage through a line of unstable equilibrium. The end fitting 660 is mounted in the shell 700 of the lever 7.

The leaf spring 643 has a first end 645 of reduced size nested in a housing of the end fitting 660. The leaf spring 643 has a second end that includes a stud 644. The second end of the leaf spring 643 is mounted to slide inside the end fitting 640. A first end of the spring 642 is nested over the stud 644. A second end of the spring 642 is nested over a stud on an end portion 646 of the end fitting 640. The end fitting 640 further includes a stud at the front of this upper face over which a first end of the spring 641 is nested. A second end of the spring 641 loads an internal face of the handle 421. The end fitting 640 is mounted to slide in a groove 702 in the rear portion of the shell 700.

Figure 10:
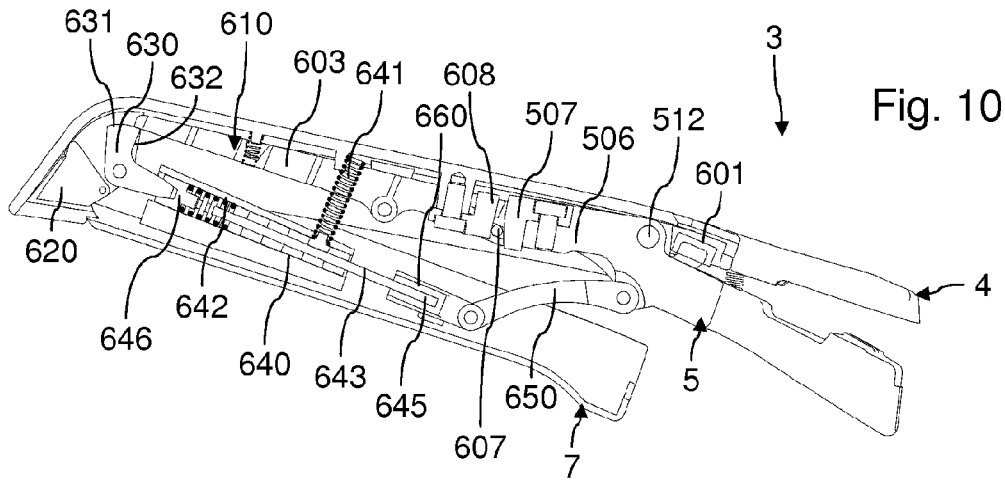
FIGS. 10 to 12 are sectional side views of the removable handle assembly in different operating configurations.
Figure 11:
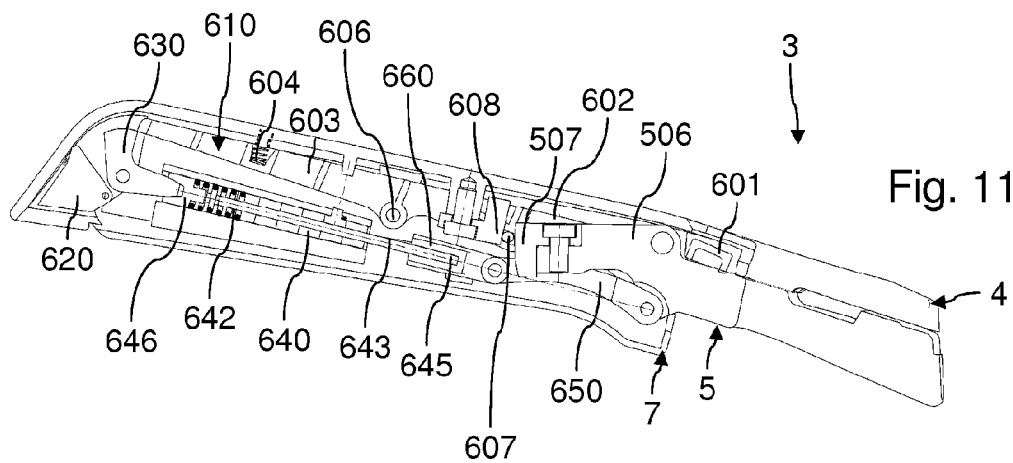
Figure 12:
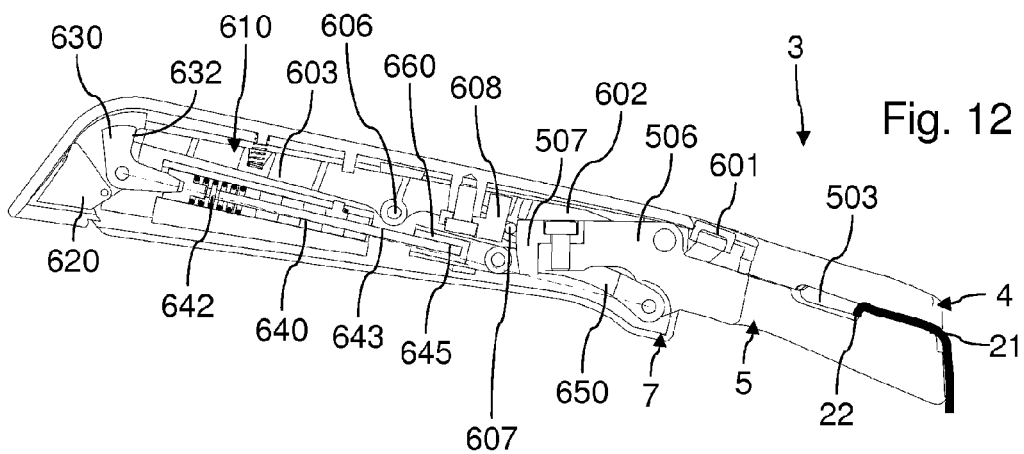

The locking pawl 630 is pivotally mounted on the bracket 620 by means of a shaft 621. The pawl 630 has a first end accommodated in a slot in the end 646, as shown in FIGS. 10 to 12. The pawl 631 has an upper guide face 631 and a face 632 forming a step relative to the upper face 631. The pawl 630 is constrained to rotate with the lever 7 as it is driven in rotation by the end 646.

FIGS. 10 to 12 are sectional side views of the removable handle assembly 3 in different operating configurations.

In the configuration shown in FIG. 10, the mobile jaw 5 is held in its release position by the springs 510 and 641. This release position enables introduction of the lip 21 of the cooking vessel 2 between the fixed jaw and the mobile jaw 5. The mobile jaw 5 holds the lever 7 in the deployed position by means of the bracket 650 (forming a link for transmission of force between the jaw 5 and the lever 7). The lever 7 is also held in the deployed position by the return spring 641. In this position, the rear portion 603 of the swing-arm 610 rests on a guide face 631 of the pawl 630. The swing-arm 610 is therefore pivoted into a position that holds the locking shaft 607 in a lowered position. In this lowered position, the locking shaft 607 is accommodated with clearance in a housing formed between the locking stud 608 and the locking stud 507.

In the configuration shown in FIG. 11, the removable handle assembly 3 is in an intermediate position of its locking movement. In this position, the user loads the lever 7 manually. The retraction movement of the lever 7 urges the mobile jaw 5 toward its clamping position via the bracket 650. The assembly formed of the end fittings 640, 660 and the leaf spring 643 is then driven in rotation substantially about the rotation axis of the pawl 630. The pawl 630 pivots progressively towards the rear, because of the pivoting of the end fitting 640 induced by the lever 7. The rear portion 603 of the swing-arm 610 slides on the guide face 631 toward the step 632 of the pawl 630. The swing-arm 610 is still held in its unlocking position. The pivoting of the mobile jaw 5 induces pivoting of its rear portion 506. The locking shaft 607 is still held with clearance between the two locking studs 608 and 507. Because the stud 507 has a domed shape, the clearance for the shaft 607 between the studs 608 and 507 decreases as the mobile jaw 5 pivots.

In the configuration shown in FIG. 12, the removable handle assembly 3 is in its clamping position. In this position, the toggle clamp formed by the association of the bracket 650, the end fittings 640 and 660 and the leaf spring 643 holds the mobile jaw 5 in a stable clamping position. The use of a toggle clamp is particularly advantageous because an opening force exerted on the mobile jaw 5 urges the toggle clamp toward a stable locking position. In this position, the lever 7 is sufficiently loaded for the pawl 630 to be pivoted toward the rear. The end of the rear portion 603 of the swing-arm 610 reaches the step 632 of the pawl 630. Because of the loading of the spring 604, the swing-arm 610 pivots so that the rear portion 603 of the swing-arm 610 is lowered while the front portion 602 of the swing-arm 610 is raised, until the unlocking button 601 lodges in the opening 411. When the swing-arm 610 pivots, the shaft 607 slides over the domed face of the locking stud 507 until it reaches a locking position in which it is held with no clearance between the locking stud 608 and the locking stud 507. As shown, the lip 21 of the cooking vessel 2 can be held in a stable manner clamped between the mobile jaw 5 and the fixed jaw of the gripping body 4.

In this clamping position, the unlocking button 601 is accessible to the user. To unlock, the user presses the button 601 and exerts sufficient force to compress the return spring 604. The swing-arm 610 then pivots and the end of its rear portion 603 slides over the step 632 to reach the guide face 631, the return spring causing the pawl 630 to pivot toward the front so that the guide face 631 then holds the swing-arm 610 in the unlocking position. During the pivoting of the swing-arm 610, the front portion 602 of the swing-arm 610 drives the shaft 607 downward to a position in which it again has clearance relative to the locking studs 608 and 507. The shaft 607 then no longer locks the mobile jaw 5 in the clamping position.

A removable handle assembly 3 in accordance with the invention can grip a great variety of cooking vessels having different diameters without scratching or deforming them. The projections of linear shape enable easy adaptation to a wide range of different diameters of heating vessels. Various tests have shown that the removable handle assembly is perfectly suitable for gripping a cooking vessel 2 having a diameter between 140 mm and 320 mm (corresponding to the outside diameter of the lateral wall) and a thickness of the lip 21 between 0.7 and 3 mm, advantageously between 1 and 2.5 mm.

The locking movement, through pivoting of the lever 7, proves particularly reassuring for the user, since this pivoting of the lever 7 induces similar clamping pivoting of the mobile jaw 5. The user thus has the impression of acting directly on the clamping member. Clamping induced by pivoting of the lever 7 further enables the user to exert a high locking force easily.

The locking of the mobile jaw 5 in the clamping position is particularly reliable, because it is exerted directly on this mobile jaw 5 by the shaft 607 and the bracket 650. This avoids introducing clearances into the locking system.

The locking of the mobile jaw 5 in the clamping position by a toggle clamp is particularly safe for the user because the user feels the feedback effect of passing over a hard spot when the locking by the shaft 607 is effected.

The use of a fixed jaw on the gripping body 4 makes it possible to limit the number of mobile components among the components participating in the clamping. This guarantees reliable clamping of the lip 21 with minimum play. The use of the fixed jaw also makes it possible to obtain an optimum stiffness of a removable handle assembly 3.

The combination of great rigidity of the jaws and absence of play in the locking mechanism 6 in the clamping position makes it possible to ensure that contact with the lip 21 is maintained without necessitating an excessive clamping force that would lead to damaging the surface of the vessel 2.

The use of the spring 642 makes it possible to uncouple the mobile jaw 5 from the lever 7 at the end of the travel of this lever 7 so as to limit and control the clamping force exerted on the lip 21 of the vessel 2. This makes it possible to prevent damaging the surface of the lip 21 and enables the use of cooking utensils having lips of different thicknesses.

The opening 411 is advantageously at the front end of the gripping body 4, for example where the fixed jaw is flared. The unlocking button 601 is then easily accessible to the user.

In practice, the front end 402 has a Y-shape with two branches extending laterally relative to the longitudinal direction. An opening is therefore formed between the two branches to free up maximum access to the interior of the vessel 2 and to avoid interference with a lid, if any, of the vessel 2. In practice, the front end of the mobile jaw 5 also has a Y-shape, with two branches extending laterally relative to the longitudinal direction. An opening is therefore formed between the two branches so as to avoid having the mobile jaw 5 interfere with the lateral wall of the vessel 2 and also to facilitate washing the removable handle assembly 3. In order to ensure stability and an optimum retaining force on the vessel 2, the projections 404 are advantageously at least 50 mm apart, and are advantageously between 60 and 70 mm apart.

The directions of the projections 404 advantageously intersect between 80 and 150 mm in front of these projections 404 (illustrated by the distance R10 in FIG. 6). This distance could optimally be between 90 and 110 mm, and preferably of the order of 200 mm. The projections 404 will advantageously have a length between 15 and 25 mm to provide an adequate bearing area on the lip 21 and to ensure good resistance to flexing induced by the vessel 2. The central portion of the projections 404 could, for example, be at an optimum distance (R11) between 100 mm and 120 mm relative to the intersection between the directions of these projections 404. In projection onto a plane including the longitudinal direction, the directions of the projections 404 will advantageously form an angle between 12° and 22° with this longitudinal direction. The projections 404 advantageously have a thickness between 0.5 mm and 2.5 mm.

In order to obtain a vessel 2 that has an inwardly-inclined lip 21, the longitudinal direction advantageously forms an angle between 5° and 30° relative to a plane that includes the directions of the projections 404.

The locking stud 507 advantageously has a radius of curvature corresponding to its distance from the axis of the bore 511. When the mobile jaw 5 pivots, the clearance between the shaft 607 and the locking stud 507 therefore remains constant for a given position of the shaft 607. The locking stud 608 is advantageously substantially flat. Accordingly, when the shaft 607 is urged to pivot upward, the clearance between the studs 507 and 608 is progressively reduced in order to achieve progressive locking of the jaw 5 in its clamping position.

The contact faces 501 of the mobile jaw 5 are advantageously of substantially linear shape so as to be able to provide a satisfactory bearing surface for different diameters of the vessels 2. In order to provide a satisfactory bearing area for a substantially vertical lateral wall of the vessel 2, the bearing surfaces 501 are advantageously substantially vertical and perpendicular to the longitudinal axis of the removable handle assembly 3 when the mobile jaw 5 is in its clamping position. The bearing surfaces 501 may advantageously form an angle between 65° and 90° relative to the direction of the projections 504. In order to provide a high resistance to pivoting of the vessel 2 without inducing an excessive overall size, the contact faces 501 advantageously extend over a length between 10 mm and 25 mm. Because the mobile jaw 5 is flared, the contact surfaces 501 are sufficiently far apart to prevent pivoting of the removable handle assembly 3 relative to the vessel 2 about a vertical axis. The surfaces 501 are at least 50 mm from each other, for example.

The peripheral lip 21 of the vessel 2 advantageously has a substantially conical shape, with an angle at the apex of the cone that is advantageously between 60 and 85°. The profiles of the lips 21 for vessels 2 with different diameters therefore have relatively small differences. The cross sections of the various lips 21 are in fact identical. As shown in FIG. 12, the peripheral lip 21 advantageously includes a curved rim 22 facilitating locking of the lip 21 when the latter is clamped by the removable handle assembly 3. The rim 22 of the lip 21 engages in the recessed portion 503 so that more than just friction fixes the vessel 2 to the handle assembly.

With the combination of the vessel 2 and the removable handle assembly 3 in accordance with the embodiment shown, the handle assembly 3 has virtually no projection inside the vessel. In fact, the front end 402 of the gripping body 4 essentially serves as a lengthwise bearing surface on the lip 21 to resist the bending moment induced by the vessel 2.

Having described the invention, and a preferred embodiment thereof, what is claimed as new, and secured by Letters Patent is:

1. An apparatus comprising a removable handle assembly for a cooking vessel, said removable handle assembly comprising a gripping body, a flared mobile jaw, an actuating lever, and a locking mechanism, wherein said gripping body comprises a front end, wherein said front end forms a flared fixed jaw, wherein said flared fixed jaw comprises a first projection and a second projection, wherein said first projection and said second projection are adapted to clamp to a wall of a cooking vessel, wherein said first projection is linear along a first direction, wherein said second projection is linear along a second direction, wherein said first direction and said second direction intersect in front of said gripping body, wherein said flared mobile jaw is mounted on said gripping body to transition, through rotation about a first axis, between a release position and a clamping position, wherein said flared mobile jaw comprises a first projection and a second projection, wherein said first projection is linear and extends along a third direction, wherein said second projection is linear and extends along a fourth direction, where said third projection intersects said fourth direction in front of said gripping body, wherein said actuating lever is mounted on said gripping body, wherein said actuating lever is configured to transition, through rotation about a second axis, between a deployed position and a retracted position, and wherein said locking mechanism is actuated by said actuating lever for locking said mobile jaw in said clamping position.

2. The apparatus of claim 1, wherein said flared fixed jaw of said gripping body is Y-shaped, and wherein a front end of said flared mobile jaw is Y-shaped.

3. The apparatus of claim 1, wherein said gripping body comprises a handle that extends to a rear end of said gripping body, wherein said handle extends in a direction that forms an angle of between 5° and 30° relative to a plane that includes said directions of said projections of said flared fixed jaw of said gripping body.

4. The apparatus of claim 1, wherein said intersection between said directions of said projections of said gripping body is located between 80 mm and 150 mm in front of said projections.

5. The apparatus of claim 1, wherein said flared mobile jaw comprises a face configured to bear on a cooking vessel in said clamping position, and wherein said face forms an angle between 65° and 90° relative to one of the third and fourth direction.

6. The apparatus of claim 1, wherein said flared mobile jaw comprises a recessed portion to a rear of said third and fourth projections thereof.

7. The apparatus of claim 1, wherein said projections of said gripping body and said projections of said mobile jaw are superposed when said mobile jaw is in said clamping position.

8. The apparatus of claim 7, wherein there exists a distance of between 0.7 mm and 3 mm between said projections of said gripping body and said projections of said mobile jaw when said mobile jaw is in said clamping position.

9. The apparatus of claim 1, wherein said locking mechanism comprises a swing-arm and a locking member, wherein said swing-arm is mounted to pivot about an axis parallel to said second axis of said lever, wherein said swing-arm is urged toward a locking position by a return force, and wherein said locking member is mounted to slide in a radial direction of said swing-arm, wherein said locking member is constrained to pivot with said swing-arm, wherein said locking member is accommodated in a space between a wall fastened to said gripping body and a wall fastened to said mobile jaw, wherein said space reduces in size along said pivoting travel of said locking member induced by said return force until a clearance between said locking member and said walls is zero.

10. The apparatus of claim 1, further comprising a cooking vessel, wherein said cooking vessel comprises a lateral wall and a peripheral lip, wherein said peripheral lip extends extending from said lateral wall, wherein said peripheral lip is configured to be clamped between said flared fixed jaw of said gripping body and said flared mobile jaw in said clamping position, whereby said cooking vessel and said removable handle assembly cooperate to form a cooking utensil.

* * * * *